United States Patent [19]
Herr et al.
[11] 4,195,768
[45] Apr. 1, 1980

[54] ROLLER BEARING INTERNAL PINION COUNTER

[75] Inventors: Robert W. Herr, Fort Wayne; Edward D. Sigl, Bluffton, both of Ind.
[73] Assignee: Bowmar Instrument Corporation, Fort Wayne, Ind.

[21] Appl. No.: 948,957
[22] Filed: Oct. 5, 1978
[51] Int. Cl.[2] .......................... G06C 27/00; G01C 22/00
[52] U.S. Cl. .......................... 235/103; 235/1 C; 235/95 R; 235/117 R; 235/139 A
[58] Field of Search .......................... 235/103, 1 A, 1 C, 94, 235/95 R, 96, 117 R, 139 R, 139 A

[56] References Cited

U.S. PATENT DOCUMENTS

| | | | |
|---|---|---|---|
| 3,002,687 | 10/1961 | Herr | 235/117 R |
| 3,097,792 | 7/1963 | Harada | 235/95 R |
| 3,630,436 | 12/1971 | Sanz et al. | 235/117 R |
| 3,635,395 | 1/1972 | Walsh | 235/1 A |
| 3,667,671 | 6/1972 | Hachtel | 235/117 R |

*Primary Examiner*—Stephen J. Tomsky
*Attorney, Agent, or Firm*—Gust, Irish, Jeffers & Hoffman

[57] ABSTRACT

An internal pinion revolution counter includes a bearing member rotatably supporting an input shaft. At least first and second number wheels are provided each having a radially outwardly extending web portion joined to an annular flange portion, the first and second number wheel flange portions respectively extending toward each other. Each web portion has an annular bearing surface which defines a central opening. The flange portion of the first number wheel has an internal gear segment and cooperating internal locking cam formed thereon, and the flange portion of the second number wheel has an internal full tooth gear formed thereon. The first number wheel is connected to the input shaft for rotation therewith. A pinion carrier is arranged within the center opening in the web portion of the second number wheel, surrounds the input shaft, and is secured against rotation with respect to the input shaft. A transfer pinion is rotatably connected to the pinion carrier, has full tooth portions respectively meshing with the full tooth gear and the rear segment, and a mutilated portion cooperating with the locking cam. A plurality of rollers are rotatably connected to the pinion carrier and engage the bearing surface of the web portion of the second number wheel thereby rotatably to support the same.

17 Claims, 11 Drawing Figures

ROLLER BEARING INTERNAL PINION COUNTER

BACKGROUND OF THE INVENTION

1. Description of the Prior Art

An internal pinion revolution counter is a type of counter in which the intermittent motion transfer mechanisms, typically segmental gear, locking cam and mutilated pinion assemblies, are located within the outer periphery of the number wheels. There are two general types of internal pinion revolution counters, i.e., the spur gear type as shown, for example, in U.S. Pat. No. 3,002,687, assigned to the assignee of the present invention, and the internal gear type as shown, for example in U.S. Pat. Nos. 3,635,395 and 3,667,671.

In the design of revolution counters, particularly for aerospace and navigational applications, it is desirable to provide both low torque and low backlash, i.e., minimum lost motion at the point of transfer of motion between lower and higher order number wheels when all of the numbers come up together; low torque vis-a-vis low backlash is generally a compromise. Internal pinion counters are generally preferred in airborne applications by reason of their low package volume. It is difficult to manufacture internal pinion counters of the internal tooth type using metal gears unless the internal tooth gears are die cast and thus, most internal pinion counters are of the spur gear type which generally provide low torque operation but are frequently unsatisfactory insofar as backlash is concerned. Consequently, most internal pinion counters of the internal tooth type have used molded plastic parts; however, such plastic counters have been generally unsatisfactory due to inconsistencies in the molded plastic parts. Nevertheless, internal pinion counters of the internal gear type are advantageous with respect to control of backlash since the gear mesh is spaced radially outwardly from the input shaft adjacent the outer periphery of the number wheels. However, the number wheels of prior internal pinion counters of the internal gear type known to the present applicants have been rotatably mounted on a mandrel, typically the input shaft, which thus contributes to excessive torque.

It is now possible to mold plastic parts with considerable accuracy which eliminates some of the objections to prior internal pinion counters of the internal gear type and it is therefor desirable to provide an internal pinion counter of the internal gear type which affords the best compromise between torque and backlash, and which also permits choice, i.e., adjustment of torque vis-a-vis backlash.

SUMMARY OF THE INVENTION

The invention, in its broader aspects, provides an internal pinion revolution counter of the internal gear type including a rotatable input shaft the revolutions of which are to be counted, a bearing member rotatably supporting the input shaft, and at least first and second number wheels each having a radially outwardly extending web portion joined to an outer annular flange portion, the first and second number wheel flange portions respectively extending toward each other. Each web portion has a central opening formed therein, at least the second number wheel web portion having an annular bearing surface formed thereon defining the central opening therein. The first number wheel flange portion has an internal gear segment and cooperating internal locking cam formed thereon, and the second number wheel flange portion has an internal full tooth gear formed thereon, and means are provided for mounting the first number wheel on the input shaft for rotation therewith. A pinion carrier member is provided disposed within the opening in the second number wheel web portion and surrounding the shaft, and means are provided for securing the pinion carrier member against rotation with respect to the shaft. A transfer pinion is provided with means for rotatably connecting the same to the pinion carrier member, the transfer pinion having full tooth portions respectively cooperating with the full tooth gear and the gear segment, and a mutilated portion cooperating with the locking cam. A plurality of rollers are provided with means for rotatably connecting the rollers to the pinion carrier member, the rollers engaging the second number wheel web portion bearing surface thereby rotatably supporting the second number wheel on the pinion carrier member.

It is accordingly an object of the present invention to provide an improved internal pinion revolution counter of the internal gear type.

Another object of the present invention is to provide an improved internal pinion revolution counter of the internal gear type which permits adjustment of torque vis-a-vis backlash.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
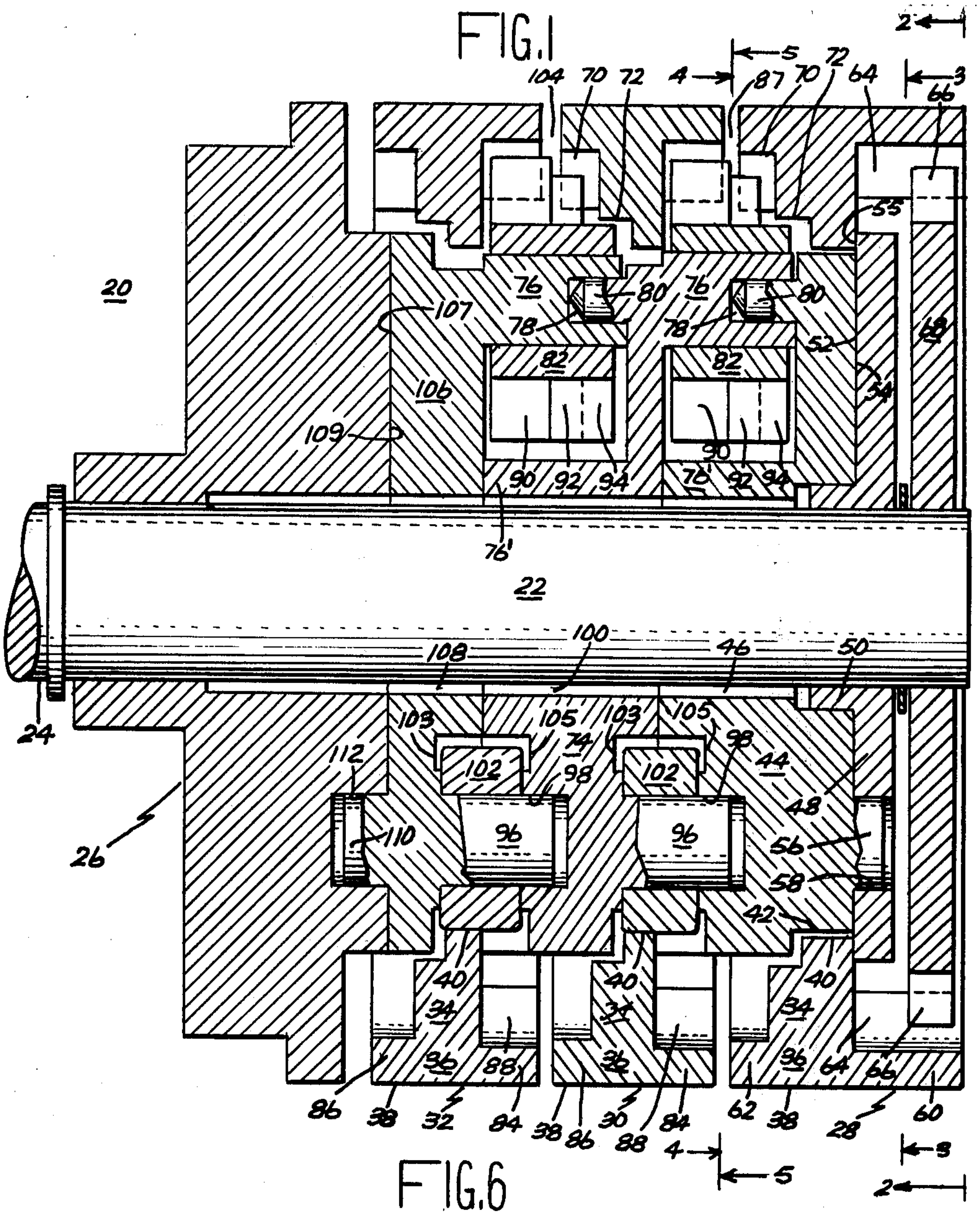
FIG. 1 is a side, cross-sectional view showing the preferred embodiment of the invention.

Referring now to FIGS. 1 through 6 of the drawings, the improved internal pinion revolution counter of the invention, generally indicated at 20, comprises input shaft 22 having extension portion 24 adapted to be connected to the rotating source of revolutions to be counted. Input shaft 22 is rotatably supported by bearing and mounting member 26 adapted to be mounted on a panel or the like by suitable threaded fasteners (not shown).

In the illustrated embodiment, three number wheels 28, 30, 32 are provided, number wheel 28 being the "units" wheel, number wheel 30 being the "tens" wheel and number wheel 32 being the "hundreds" wheel. Each number wheel 28, 30, 32 has a radially outwardly extending web portion 34 joined to an annular flange portion 36 having a cylindrical outer peripheral surface 38 having indicating numerals inscribed or otherwise marked thereon. Web portion 34 of each number wheel 28, 30, 32 has central opening 40 formed therein.

Center opening 40 in web portion 34 of units number wheel 28 forms an annular bearing surface rotatably mounted on journal surface 42 of mandrel member 44 which surrounds shaft 22 with clearance 46 therewith. Bearing member 48 has bearing portion 50 rotatably supporting shaft 22 and has flat radial surface 52 engaging flat radial surface 54 of mandrel member 44. Pins 56 on surface 54 of mandrel member 44 extend into openings 58 in surface 52 of bearing member 48 to restrain members 44, 48 from rotation with respect to shaft 22, as will hereinafter be described, and also to support member 44 with clearance 46 with respect to shaft 22. Outer portion 55 of side 54 of bearing member 48 engages flange portion 34 of units number wheel 28.

Figure 4:
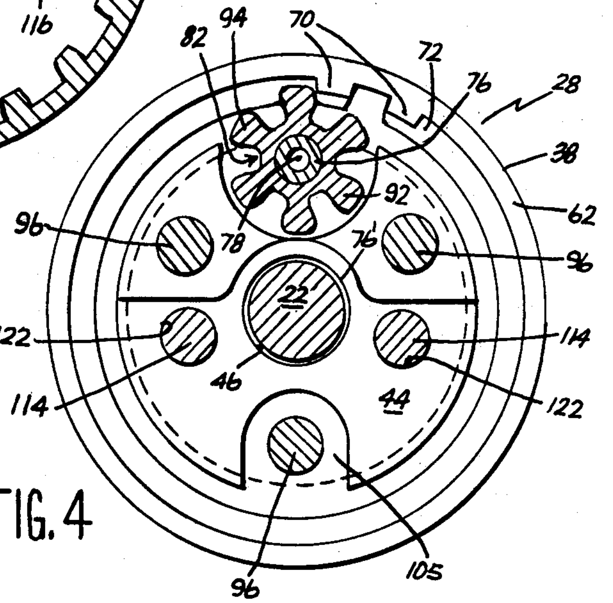
FIG. 4 is a cross-sectional view taken generally along the line 4—4 of FIG. 1.

Annular flange portion 36 of units number wheel 28 has sections 60, 62 respectively extending axially on either side of web portion 34. Internal gear teeth 64 are formed on the interior surface of section 60 of annular flange portion 36, and opposite pairs of teeth 64 are engaged by dogs 66 of driving member 68 secured to input shaft 22 (FIG. 2), thereby rotating units number wheel 28 with input shaft 22. Axially extending section 62 of annular flange portion 36 of units number wheel 28 has internal two-tooth gear segment 70 and complementary internal locking cam 72 formed thereon, as best seen in FIG. 4.

Pinion carrier member 74 is provided within central opening 40 in web portion 34 of tens number wheel 30 and abuts portion 76 of mandrel member 44. Pinion carrier member 74 has pin 76 extending axially therefrom toward mandrel member 44. Pin 76 has opening 78 in its distal end which receives pin 80 on mandrel member 44. Transfer pinion 82 is rotatably mounted on pin 76.

Figure 5:
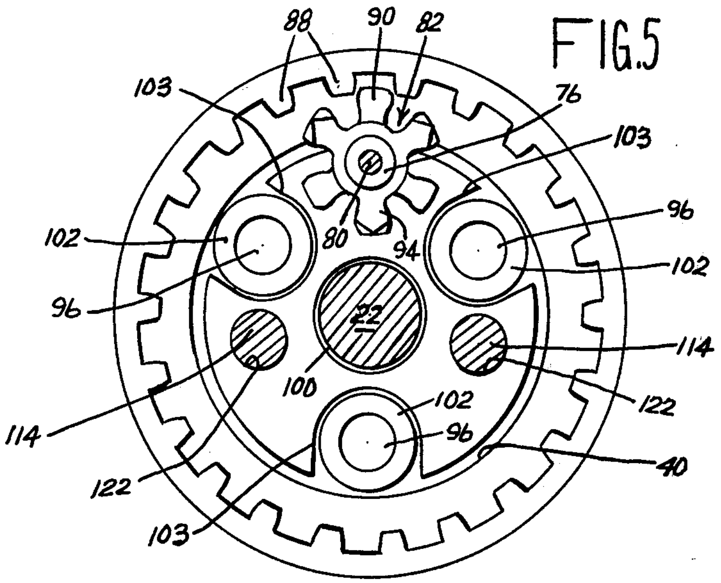
FIG. 5 is a cross-sectional view taken generally along the line 5—5 of FIG. 1.

Annular flange portion 36 of tens number wheel 30 has sections 84, 86 extending axially on either side of web portion 34, section 84 extending toward section 62 of annular flange portion 36 of units number wheel 28 but having running clearance 87 therebetween. Section 84 of annular flange portion 36 of tens number wheel 30 has full tooth internal gear 88 formed thereon. Transfer pinion 82 has full tooth portion 90 meshing with internal gear 88 on tens number wheel 30, full tooth portion 92 which meshes with two-tooth gear segment 70 on units number wheel 28 once each full revolution of units number wheel 28, and mutilated portion 94 which cooperates with locking cam 72 in conventional fashion. In the illustrated embodiment, full tooth internal gear 88 has twenty teeth, full tooth portions 90, 92 of transverse pinion 82 have six teeth and mutilated portion 94 has three teeth, as seen in FIGS. 4 and 5.

Pinion carrier member 74 has pins 96 formed thereon (FIG. 5) extending axially toward mandrel member 44 and respectively received in openings 98 therein; pins 96 are respectively in axial alignment with pins 56 on mandrel member 44. Pins 96 on pinion carrier member 74 and pin 80 on mandrel member 44 restrain rotation of pinion carrier member 74 with respect to shaft 22, as will be hereinafter more fully described. Pinion carrier member 74 surrounds shaft 22 and is spaced therefrom by clearance 100.

Rollers 102 are rotatably mounted on pins 96. Center opening 40 in web portion 34 of tens number wheel 30 forms an annular bearing surface which is engaged by rollers 102 thereby rotatably supporting tens number wheel 30 in the manner of a roller bearing, as best seen in FIG. 5. Aligned recesses 103, 105 in pinion carrier member 74 and mandrel member 44 accommodate rollers 102.

Hundreds number wheel 32 may be identical to tens number wheel 30 and has sections 84, 86 of annular flange portion 36 extending axially from either side of web portion 34, section 84 of number wheel 32 extending toward section 86 of number wheel 30 with running clearance 104 therebetween. Section 84 of annular flange portion 36 of hundreds number wheel 32 has full tooth internal gear 88 formed thereon.

Pinion carrier member 106 is disposed within center opening 40 of annular flange portion 34 of hundreds number wheel 32 and surrounds input shaft 22 with clearance 108 therewith. Pinion carrier member 106 has pin 76 thereon, identical with pin 76 of pinion carrier 74, extending toward pinion carrier 74 and having opening 78 in its distal end. Pin 80 on pinion carrier member 74 is received in opening 78 in pin 76 of pinion carrier member 106.

Transfer pinion 82, identical to transfer pinion 82 associated with units and tens number wheels 28, 30, is rotatably mounted on pin 76 on pinion carrier member 106 and has full tooth portions 90, 92 and mutilated portion 94. Full tooth portion 90 meshes with full tooth internal gear 88 on hundreds number wheel 32.

Section 86 of annular flange portion 36 of tens number wheel 30 has internal two-tooth gear segment 70 and complementary internal locking cam 72 formed thereon identical to two-tooth gear segment 70 and locking cam 72 on units number wheel 28, and which cooperates in the same fashion with full tooth portion 92 and mutilated portion 94 of transfer pinion 82 on pin 76 of pinion carrier member 106. It will thus be seen that hundreds number wheel 32 is rotated one incremental amount in response to each full revolution of tens number wheel 30.

Pinion carrier member 106 has pins 96 identical to pins 96 of pinion carrier 74, extending axially toward pinion carrier 74 and received in openings 98 therein, pins 96 and 56 being in axial alignment. Center opening 40 in web portion 34 of hundreds number wheel 32 forms an annular bearing surface engaged by rollers 102 on pins 96 of pinion carrier member 106 thus rotatably supporting hundreds number wheel 32. Pinion carrier member 106 engages portion 76' of pinion carrier member 74. Pinion carrier member 106 has pins 110 extending axially therefrom received in openings 112 in bearing member 26, pins 110 being in axial alignment with pins 96 and 56. Flat radial surface 107 of pinion carrier member 106 abuts flat radial surface 109 of bearing member 26, as shown. It will now be seen that mandrel member 44, bearing member 48, pinion carrier member 74 and pinion carrier member 106 are all connected to bearing member 26 by pins 56, 96 and 110, thus securing those members against rotation with respect to shaft 22.

Figure 6:
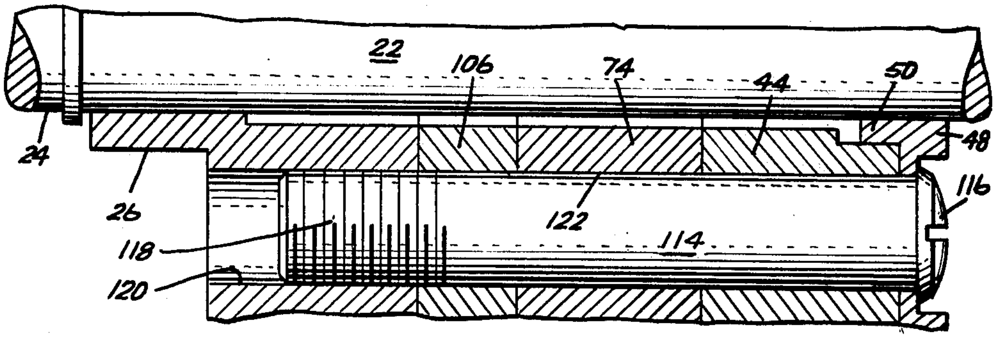
FIG. 6 is a fragmentary, side cross-sectional view taken generally along the line 6—6 of FIG. 3.
Figure 2:
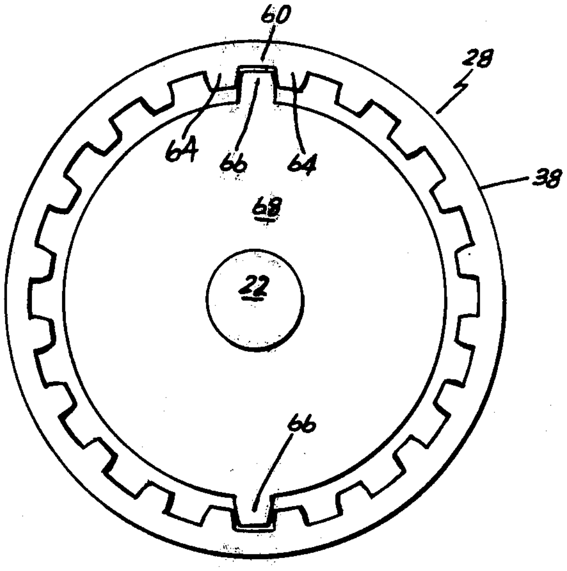
FIG. 2 is a cross-sectional view taken generally along the line 2—2 of FIG. 1.
Figure 3:
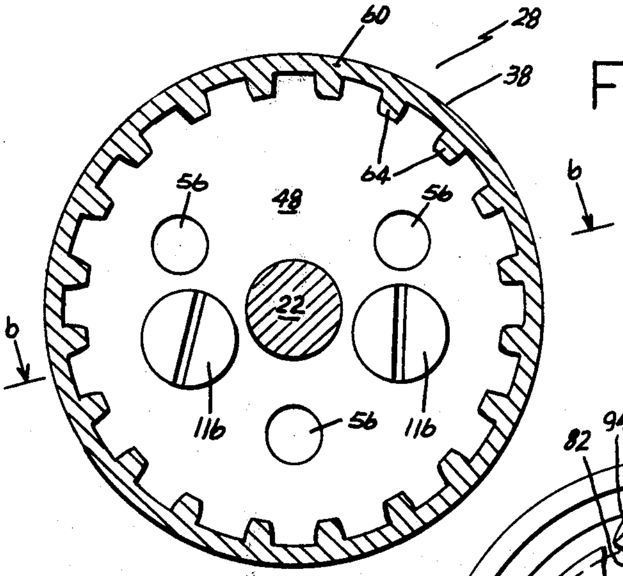
FIG. 3 is a cross-sectional view taken generally along the line 3—3 of FIG. 1.

Referring now particularly to FIGS. 3 and 6, revolution counter 20 is held in assembled relation by through-bolts 114 having heads 116 engaging bearing member 48 and ends 118 threaded in openings 120 in bearing member 26. Through-bolts 114 extend through axially aligned openings 122 in bearing member 48, mandrel member 44 and pinion carrier members 74, 106.

In an embodiment of the invention shown in FIGS. 1 through 6 having an outside diameter of 0.672 inch, all parts, with the exception of input shaft 22 and through-bolts 114, were formed of molded plastic material. It will be seen that while a three stage revolution counter is shown and described, the counter can easily be reduced to two stages by removing number wheel 30, pinion carrier 76 and its accompanying transfer pinion 82 and rollers 102. Likewise, counter 20 can be expanded readily to four or more stages by merely adding additional counter wheels 30, pinion carriers 76 and their accompanying transfer pinions 82 and rollers 102. While units number wheel 28 is shown as being rotatably mounted on mandrel member 44, it will be understood readily that roller bearing mounting of units number wheel 28 can be provided simply by rotatably mounting additional rollers 102 on mandrel member 44 in the same manner as shown in connection with pinion carrier members 74, 106.

It will be seen that the roller bearing support of the number wheels minimizes torque and that the number wheels and pinions are trapped by the pinion carriers so that the number wheels do not touch thus minimizing friction and limiting end play.

In order to control torque vis-a-vis backlash, rollers 102 may be molded or selected in increments of thousandths of an inch in diameter so that, by appropriately choosing roller diameters, the torque can be lowered and the backlash increased, or vice versa; by choosing the rollers for each pinion carrier so as to have slightly different diameters, the number of wheels can be made slightly eccentric thereby to tighten the mesh of the full tooth and two-tooth gears with the transfer pinions in order to reduce backlash. Thus, by proper selection and placement of the rollers, it is possible to obtain an optimum or desired compromise between torque and backlash.

It will be seen that the provision of the three rollers 102 on each pinion carrier provide a three-point, roller bearing support for the respective number wheels 30, 32, and it will also be understood that more than three rollers 102 may be employed for rotatably supporting each wheel.

Figure 7:
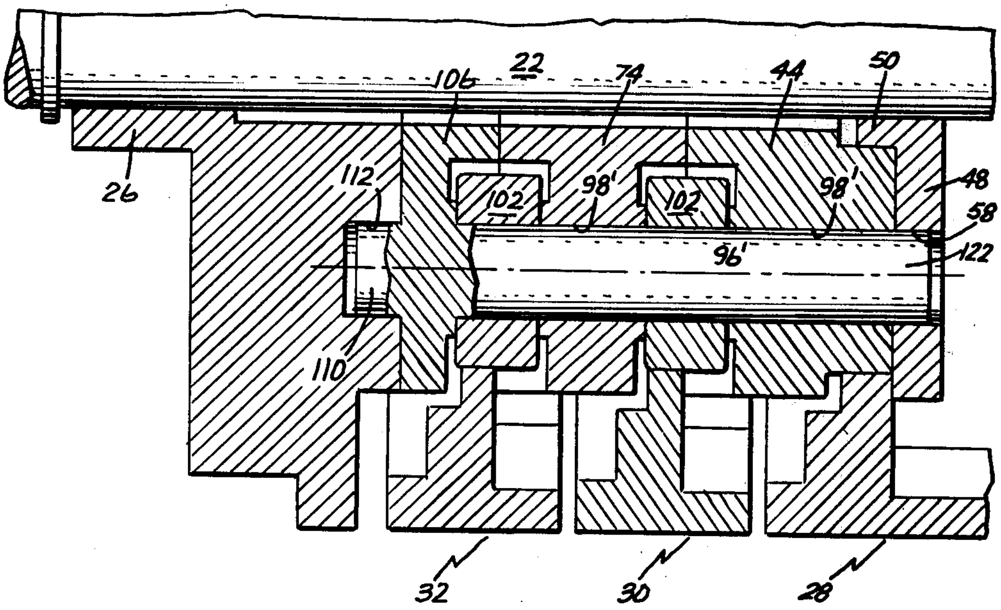
FIG. 7 is a fragmentary, side, cross-sectional view showing a modified form of roller mounting.

Referring now to FIG. 7 in which like elements are indicated by like reference numerals and similar elements by primed reference numerals, pins 96' formed on and extending axially from pinion carrier member 106 through openings 98' in pinion carrier member 74 and mandrel member 44, and having their ends 122 respectively seated in openings 58 in bearing member 48, may be employed rather than pins 96 on pinion carrier members 106, 74 and pins 56 on mandrel member 44, as shown in FIG. 1. It will be understood that through-bolts 114 are still necessary in the embodiment of FIG. 7 in order to hold the counter in assembled relation.

Figure 8:
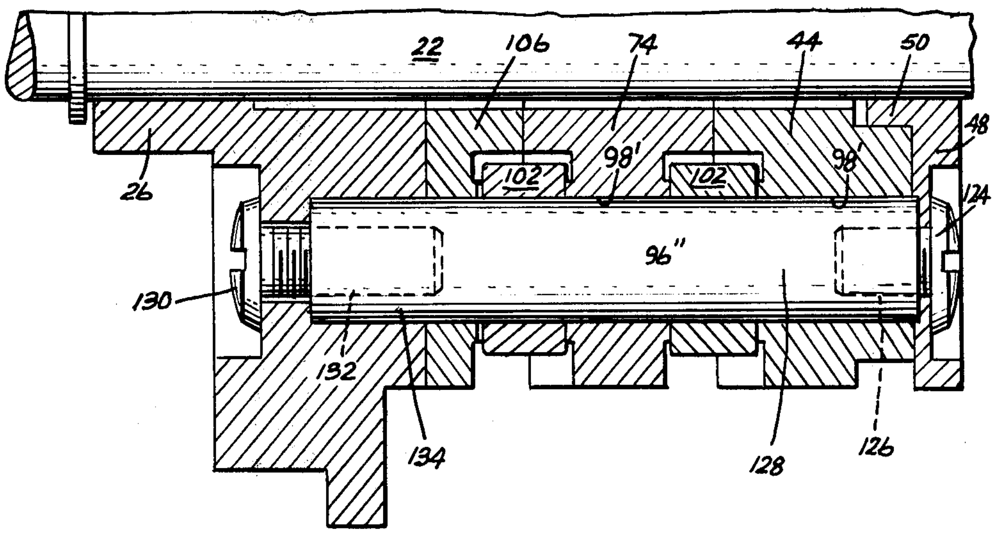
FIG. 8 is a side, cross-sectional view showing another modified form of roller mounting.

Referring now to FIG. 8 in which like elements are again indicated by like reference numerals and similar elements by double primed reference numerals, single elongated pins 96" extending through openings 98' in pinion carrier members 74, 106 and mandrel member 44 may be employed in lieu of pins 96' of FIG. 7 or pins 96 of FIG. 1. Here, threaded fasteners 124 engage bearing member 48 and are threaded into opening 126 in end 128 of pins 96", and threaded fasteners 130 engage bearing member 26 and are threaded into opening 132 in end 134 of pins 96". In this embodiment, pins 96" and threaded fasteners 124, 130 serve both to rotatably support rollers 102 and to hold the counter in assembled relation, thus permitting elimination of through-bolts 114 of FIG. 6.

Figure 9:
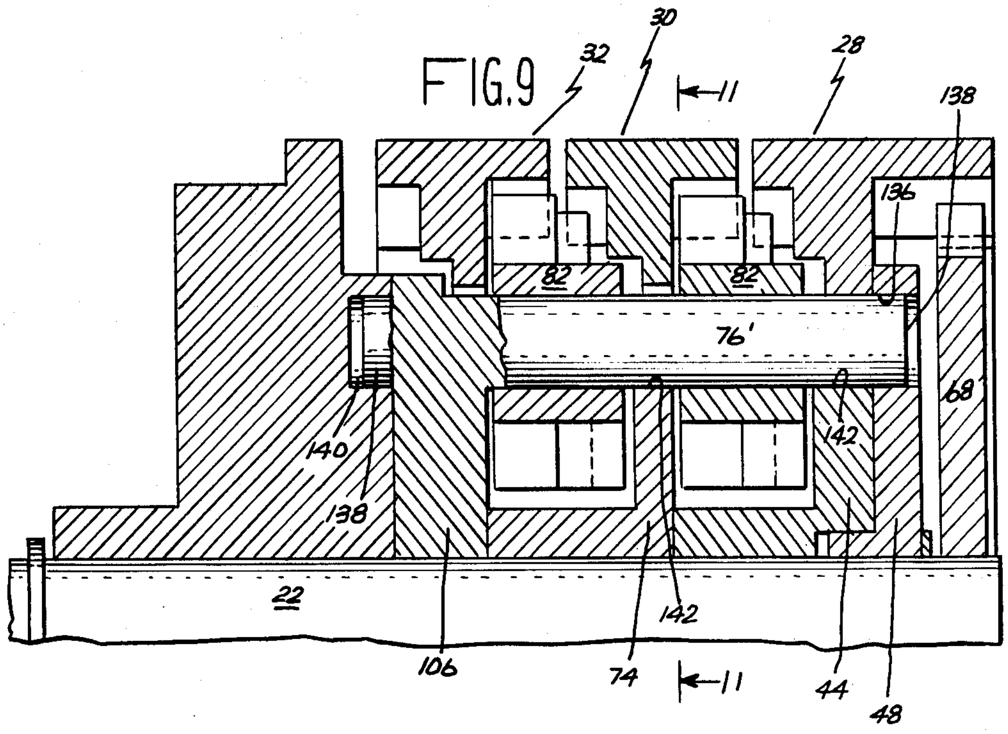
FIG. 9 is a fragmentary, side, cross-sectional view showing a modified form of transfer pinion mounting.
Figure 11:
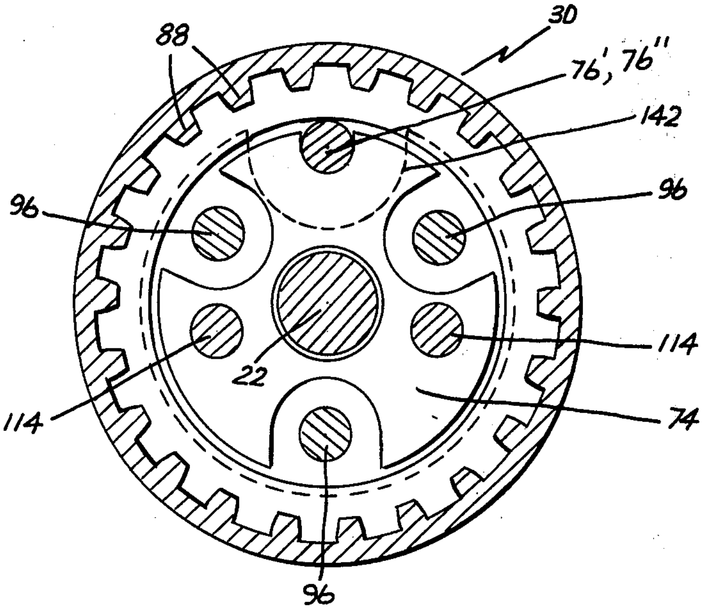
FIG. 11 is a cross-sectional view taken generally along the lines 11—11 of FIGS. 9 and 10.

Referring now to FIGS. 9 and 11 in which like elements are indicated by like reference numerals and similar elements by primed reference numerals, a construction similar to that shown in FIG. 7 may be employed for rotatably mounting transfer pinions 82. Here, pin 76' extends axially from pinion carrier member 106 through slots 142 in pinion carrier 74 and mandrel member 44 (FIG. 11) and has its end 138 seated in opening 136 in bearing member 48, transfer pinions 82 being rotatably mounted on pins 76, as shown. Pins 138 may also be provided on pinion carrier member 106 extending into openings 140 in bearing member 26. It will be understood that through-bolts 114 are still required in this construction.

Figure 10:
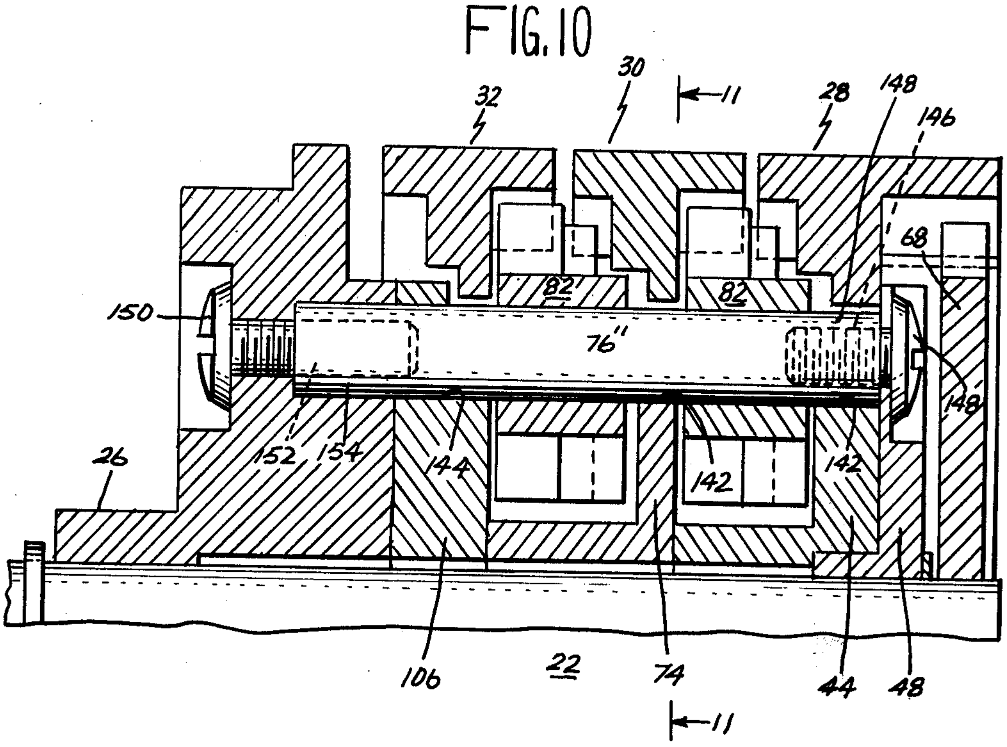
FIG. 10 is a fragmentary, side, cross-sectional view another modified form of pinion mounting.

Referring now to FIGS. 10 and 11 in which like elements are still indicated by like reference numerals and similar elements by double primed reference numerals, another arrangement is shown, similar to that shown in FIG. 8, for rotatably mounting transfer pinions 82. Here, pin 76" extends through slots 142 in mandrel member 44 and pinion carrier member 74 and opening 144 in pinion carrier member 106. Threaded fastener 148 engages bearing member 48 and is threaded in opening 146 in end 148 of pin 76". Threaded fastener 150 engages bearing member 26 and is threaded into opening 152 in end 154 of pin 76". Transfer pinions 82 are rotatably mounted on pin 76", as shown. It will be understood that the embodiments of FIGS. 9, 10 and 11 may be used alone, or with the embodiments of FIGS. 7 or 8.

While there have been described above the principles of this invention in connection with specific apparatus, it is to be clearly understood that this description is made only by way of example and not as a limitation to the scope of the invention.

What is claimed is:

1. An internal pinion revolution counter comprising: a rotatable input shaft the revolutions of which are to be counted; a bearing member rotatably supporting said shaft; at least first and second number wheels each having a radially outwardling extending web portion joined to an outer annular flange portion, said first and second number wheels flange portions respectively extending toward each other, each said web portion having a central opening formed therein, at least said second number wheel web portion having an annular bearing surface formed thereon defining said central opening therein, said first number wheel flange portion having an internal gear segment and cooperating internal locking cam formed thereon and said second number wheel flange portion having an internal full tooth gear formed thereon; means for mounting said first number wheel on said shaft for rotation therewith; a pinion carrier member disposed within said opening in said second number wheel web portion and surrounding said shaft; means for securing said pinion carrier member against rotation with respect to said shaft; a transfer pinion and means for rotatably connecting the same to said pinion carrier member; said transfer pinion having full tooth portions respectively cooperating with said full tooth gear and gear segment and a mutilated portion cooperating with said locking cam; a plurality of rollers and means for rotatably connecting the same to said pinion carrier member; said rollers engaging said second number wheel web portion bearing surface thereby rotatably supporting said second number wheel on said pinion carrier member.

2. The counter of claim 1 wherein said securing means connects said pinion carrier member to said bearing member.

3. The counter of claim 2 wherein said first number wheel web portion has an annular bearing surface formed thereon defining said central opening therein, said first number wheel mounting means comprising a mandrel member having an annular outer surface, said first number wheel web portion bearing surface being rotatably mounted on said mandrel member annular surface, said mandrel member surrounding said shaft and being connected to said pinion carrier member, and driving means mounted on said shaft and connected to said first number wheel for rotating the same with said shaft.

4. The counter of claim 3 wherein said pinion connecting means comprises a pin on said pinion carrier member extending axially toward said mandrel member, said transfer pinion being rotatably mounted on said pin.

5. The counter of claim 4 wherein said pin has a distal end with a cavity formed therein, said mandrel member having a projection formed thereon extending into said cavity.

6. The counter of claim 3 wherein said pinion connecting means comprises another shaft in spaced, parallel relationship with said input shaft and having opposite ends, one of said other shaft ends being connected to said bearing member and the other end being connected to said mandrel member, said pinion carrier member having an opening therein with said other shaft extending therethrough, said pinion being rotatably mounted on said other shaft.

7. The counter of claim 3 wherein said roller connecting means comprises a plurality of pins on said pinion carrier extending axially toward said mandrel member, said rollers being respectively rotatably mounted on said pins.

8. The counter of claim 7 wherein each of said pins has a distal end, said mandrel member having a plurality of openings therein respectively having said distal ends of said pins seated therein.

9. The counter of claim 3 wherein said mandrel member has a radial side surface remote from said pinion carrier member, said first number wheel web portion having a radial side surface remote from said second number wheel, and further comprising another bearing member on said shaft and having a radial side surface engaging said side surface of said mandrel member and said first number wheel web, and means for connecting said other bearing member to said first-named bearing member.

10. The counter of claim 9 wherein said pinion carrier and mandrel members have axially aligned openings therethrough spaced from said shaft, said last-named connecting means comprising threaded fastener means engaging said bearing members and having a section extending therebetween through said last-named openings.

11. The counter of claim 10 wherein said pinion connecting means comprises said thread fastener means section, said pinion being rotatably mounted on said section.

12. The counter of claim 10 wherein there are a plurality of said threaded fastener means, said roller connecting means respectively comprising said threaded fastener means sections, said rollers being respectively rotatably mounted on said sections.

13. The counter of claim 3 wherein said roller connecting means comprises a plurality of shafts in spaced, parallel relationship with said input shaft and respectively having opposite ends, each of said other shafts having one end connected to said bearing member and the other end connected to said mandrel member, said rollers being respectively rotatably mounted on said shafts.

14. The counter of claim 3 wherein a portion of said pinion carrier member engages a portion of said mandrel member, said pinion carrier member and said mandrel member having a plurality of aligned recesses therein respectively having said pinion and rollers disposed therein.

15. The counter of claim 14 further comprising a third said number wheel between said first number wheel and said support member, said third number wheel web portion having an annular bearing surface thereon defining said central opening therein, said second number wheel having another annular flange portion extending toward said third number wheel annular flange portion, said other flange portion of said second number wheel having an internal gear segment and cooperating internal locking cam formed thereon and said third number wheel flange portion having an internal full tooth gear thereon, a second pinion carrier member disposed within said third number wheel web portion opening and surrounding said shaft, said second pinion carrier member engaging said support member and having a portion engaging another portion of said first-named pinion carrier member, said securing means comprising a member engaging said support and mandrel members and extending through openings in said pinion carrier members, a second said transfer pinion and means for rotatably connecting the same to said second pinion carrier member, said second pinion having full tooth portions respectively cooperating with said third number wheel full tooth gear and second number wheel gear segment and a mutilated portion cooperating with said second number wheel locking cam, and a second plurality of rollers and means for rotatably connecting the same to said second pinion carrier, said second rollers engaging said third number wheel web portion bearing surface thereby rotatably supporting said third number wheel on said second pinion carrier member, said first and second pinion carrier members having a plurality of aligned recesses therein respectively having said second pinion and second rollers therein.

16. The counter of claim 1 wherein said securing means includes a pin, and means for connecting said pin to said pinion carrier member, said bearing member having an opening formed therein with said pin seated therein.

17. The counter of claim 1 wherein the diameters of said rollers are dimensioned so as to provide said counter with predetermined backlash and torque.

* * * * *